(12) United States Patent
Schadow

(10) Patent No.: US 11,048,553 B1
(45) Date of Patent: Jun. 29, 2021

(54) PROCESSING OF MESSAGES AND DOCUMENTS CARRYING BUSINESS TRANSACTIONS

(71) Applicant: Gunther Schadow, Indianapolis, IN (US)

(72) Inventor: Gunther Schadow, Indianapolis, IN (US)

( * ) Notice: Subject to any disclaimer, the term of this patent is extended or adjusted under 35 U.S.C. 154(b) by 0 days.

(21) Appl. No.: 17/019,543

(22) Filed: Sep. 14, 2020

(51) Int. Cl.
*G06F 9/48* (2006.01)
*G06F 40/289* (2020.01)
*G06F 9/50* (2006.01)
*G06Q 10/06* (2012.01)

(52) U.S. Cl.
CPC ............ *G06F 9/4881* (2013.01); *G06F 9/505* (2013.01); *G06F 9/5044* (2013.01); *G06F 40/289* (2020.01); *G06Q 10/06316* (2013.01)

(58) Field of Classification Search
None
See application file for complete search history.

(56) References Cited

U.S. PATENT DOCUMENTS

| 2007/0101013 | A1* | 5/2007 | Howson | G06F 9/3824 709/231 |
| 2010/0142410 | A1* | 6/2010 | Huynh Van | H04L 12/4641 370/255 |
| 2012/0173709 | A1* | 7/2012 | Li | G06F 9/5061 709/224 |
| 2015/0309874 | A1* | 10/2015 | Liang | G06F 11/1076 714/766 |

* cited by examiner

*Primary Examiner* — Eric C Wai
(74) *Attorney, Agent, or Firm* — Georgiy L. Khayet

(57) ABSTRACT

Systems and methods for processing business transaction entities are provided. An example method includes receiving, by a task queue module, a sequence of submission entities; generating, by the task queue module and based on submission processing rules, a task for processing the submission entities; adding the task to a task queue; determining dependencies between tasks in the task queue; and executing, by worker threads on a plurality of worker instances, the tasks of the task queue, wherein the executing includes requesting, by a worker thread of the worker threads, a task from the task queue; determining, by the worker thread and based on the dependencies, that the task queue does not include pending tasks on which the task depends and, executing the task; determining, by a cloud resources director, a number and types of pending tasks in the task queue; and adjusting the types or numbers of the worker instances.

26 Claims, 9 Drawing Sheets

US 11,048,553 B1

PROCESSING OF MESSAGES AND DOCUMENTS CARRYING BUSINESS TRANSACTIONS

TECHNICAL FIELD

The present disclosure relates generally to data processing, and more particularly, to systems and methods for processing business transaction entities.

BACKGROUND

Cloud-based applications for processing messages and documents have become standard in the software industry. Currently, some of the cloud-based applications provide users with options to store and exchange business related documents and messages. However, these business-related documents and messages can have various interdependencies. Furthermore, processing of the business-related documents and messages may require multiple interdependent steps.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one example embodiment, a method for processing business transaction entities is provided. The method commences with receiving, by a task queue module, a sequence of submission entities. The method generates, by the task queue module and based on submission processing rules, at least one task for processing of the submission entities. The method adds the task to a task queue. The method then determines, by the task queue module, dependencies between tasks in the task queue. The method executes, by worker threads, the tasks of the task queue on a plurality of worker instances. The execution can include, requesting, by a worker thread of the worker threads, a task from the task queue. The execution can also include determining, by the worker thread and based on the dependencies, that the task queue does not include pending tasks on which the task depends. In response to the determination, the method can execute the task by the worker thread.

The method may also include receiving, by the task queue module, an indication that the worker thread has finished the task. The method can generate, by the task queue module and based on the submission processing rules, one or more follow up tasks. The method then adds, by the task queue module, the follow up tasks to the task queue. The method may also include updating, by the task queue module, the dependencies between tasks in the task queue.

The submission entity may include a document or a message carrying business transaction. The tasks may include one of the following: validating a submission entity of the sequence of the submission entities against a schema, validating content of the submission entity against business rules, applying the content to update the state of a database, transforming the submission entity into one or more renderings, translating the submission entity from a first human language into a second human language, performing natural language processing of the submission entity, and indexing the submission entity with at least one index for a free text search. The natural language processing can include one of the following: phrase detection, concept detection, and natural language parsing.

Hardware utilized for at least one of the worker instances can be optimized for processing one of the following: memory intensive tasks, processor intensive tasks, tasks requiring reading or writing access to same resources, such as storage of a database, and tasks requiring support of acceleration hardware. The worker instances may include physical computer machine instances. The worker instances may include virtual computer instances. The virtual computer instances may include at least one cloud-based computing resource. At least two of the worker threads can be executed on the same worker instance of the worker instances.

Determining the dependencies between the tasks in the task queue may include determining whether a first submission entity of the sequence of submission entities is a later version of a second submission entity of the sequence of submission entities; the first submission entity of the sequence of submission entities explicitly refers to the second submission entity of the sequence of submission entities; or the first submission entity of the sequence of submission entities explicitly refers to subject matter determined based on identifiers, keywords, or codes included in the second submission entity of the sequence of submission entities.

Prior to determining the dependencies between the tasks in the task queue, the method may assign, by the task queue module, submission sequence numbers to the submission entities. The submission sequence numbers indicate the order of receiving the submission entities. The submission sequence numbers of the submission entities can be kept in a dependency table until all tasks associated with the submission entities are completed.

The method may also include determining, by the task queue module and based on the dependency table, that the task requested by the worker thread depends on unfulfilled tasks in the task queue. The method may, in response to the determination, prevent, by the task queue module, the task from being executed by the worker thread.

The method may also determine, by the task queue module, that the worker thread has failed to complete the task. The method may, in response to the determination, permit, by the task queue module, a further worker thread of the worker threads to execute the task.

The method may include determining, by the task queue module, that the worker thread has failed to complete the task. The method may receive, by the task queue module from the worker thread, an indication that the task can be completed by the worker thread or by a further worker thread. The method may, in response to the indication, permit, by the task queue module, the first worker thread or the second worker thread to repeatedly execute the task for a pre-determined maximum number of attempts. The method may determine, by the task queue module, that the task has not been completed after the pre-determined maximum number of attempts. The method may include, in response to the determination, marking the task as failed by the task queue module. The method may prevent, by the task queue module, further tasks from being requested and executed by the worker threads, where the further tasks depend on the task.

The method may also include determining, by a cloud resources director, a number and types of pending tasks in the task queue. The method may adjust, by the cloud resources director and based on the number and types of pending tasks, one of the types or numbers of the running worker instances.

The adjusting the types or numbers of the running worker instances may include determining that a number of tasks of a specific task type in the backlog exceeds a threshold. Base on the determination, the first worker instance of the plurality of the worker instances can be stopped and the second worker instance of the plurality of worker instances can be started. The first worker instance can be designated for the specific task type. The second worker instance can be designated for the specific task type and a capacity of the second worker instance can be larger than a capacity of the first worker instance.

The adjusting of the types or numbers of the running worker instances may include determining that a number of tasks of a specific task type in the backlog is less than a threshold. In response to the determination, the adjusting may include stopping at least one running worker instance of the plurality of the worker instances.

The adjusting of the types or numbers of the running worker instances may include determining that a number of tasks of a specific task type in the backlog is less than a threshold. In response to the determination, the adjusting may proceed with stopping a first worker instance of the plurality of worker instances, the first worker instance being designated for the specific task type. The adjusting may then proceed with starting a second worker instance of the plurality of worker instances. The second worker instance is designated for the specific task type and a capacity of the second worker instance is less than a capacity of the first worker instance.

The adjusting the types or numbers of the running worker instances may include determining that a capacity utilization level of a first worker instance of the plurality of worker instance tasks is less than a threshold. The first worker instance can be assigned to a specific task type. The adjusting may include, in response to the determination, stopping the first worker instance and starting a second worker instance of the plurality of worker instances. The second worker instance is designated for the specific task type and a capacity of the second worker instance is less than a capacity of the first worker instance. The capacity utilization level includes one of the following: a central processing unit utilization level, a memory usage percentage, and disk reading and writing utilization level.

The method may include determining, by a cloud resources director, a number and types of pending tasks in the task queue. The method may include adjusting, by the cloud resources director and based on the number and types of pending tasks, a type of at least one data resource used by at least one of the running worker instances. The adjusting may include one of the following: starting a lesser capacity data resource and stopping a higher capacity data resource or starting the higher capacity data resource and stopping the lesser capacity data resource.

According to another example embodiment, a system for processing business transaction entities is provided. The system includes a task queue module and worker threads being executed on a plurality of worker instances. The task queue module can be configured to receive a sequence of submission entities. The task queue module generates, based on submission processing rules, at least one task for processing the submission entities. The task queue module can add the task to a task queue. The task queue module can determine dependencies between tasks in the task queue. The worker threads can be configured to process the tasks of the task queue. The processing can include requesting, by a worker thread of the worker threads, a task from the task queue. The processing includes determining, by the worker thread and based on the dependencies, that the task queue does not include pending tasks on which the task depends. In response to the determination, the worker thread can execute the task.

According to yet another aspect of the disclosure, there is provided a non-transitory processor-readable medium, which stores processor-readable instructions. When the processor-readable instructions are executed by a processor, they cause the processor to implement the above-mentioned method for processing business transaction entities.

Additional objects, advantages, and novel features will be set forth in part in the Detailed Description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure provides a system and a method for processing business entities, such as messages and documents. Some of the documents and the messages may depend on other documents and messages. An example system for processing business transaction entities may include a task queue module, a cloud resource director, a plurality of worker instances, and a plurality of data resources. The worker instances and data resources may include cloud-based computing resources. The worker instances may run worker threads. The data resources can include one or more database servers.

The task queue module can receive a sequence of submission entities and generate, based on submission processing rules, tasks for processing the submission entities and the tasks to a task queue. The task queue module can determine dependencies between tasks in the task queue. A worker thread of the worker threads can request a task from the task queue. The worker thread can determine, based on the dependencies, that the task queue does not include pending tasks on which the task depends. In response to the determination, the worker thread can execute the task. The task module can update the dependencies upon receiving an indication that the task has been completed.

The cloud resource director can analyze a backlog of the task queue, load of processors, and intensity of read/write operations of the worker threads and the data resources. Based on the analysis, the cloud resource director may start additional worker instances or stop running worker instances. Additionally, based on the analysis, the cloud resource director may either start a lesser capacity data resource and stop a higher capacity data resource or start the higher capacity data resource and stop the lesser capacity data resource.

Figure 1:
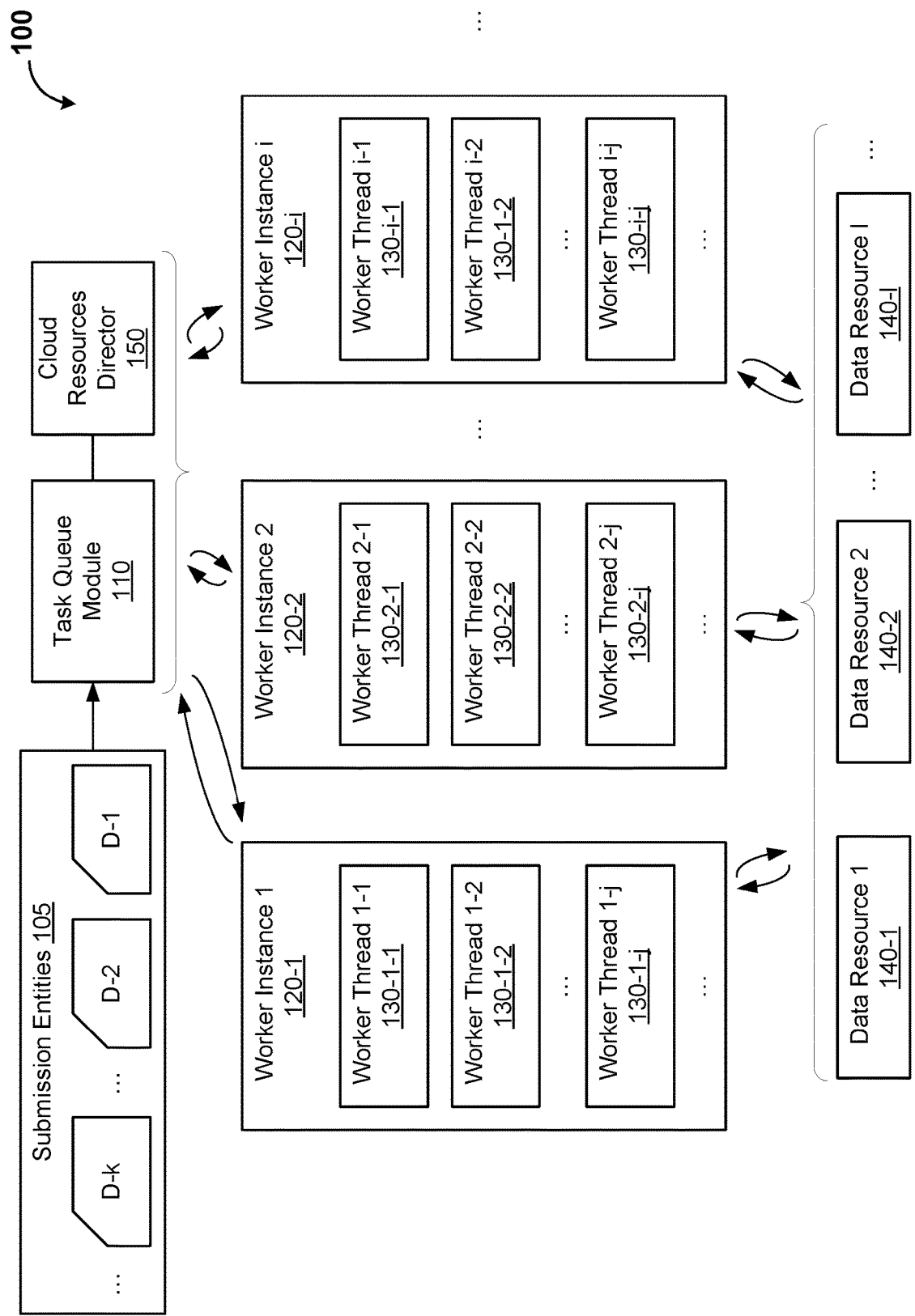
FIG. 1 is a block diagram of a system for processing business transaction entities, according to some example embodiments.

Referring now to the drawings, FIG. 1 is a block diagram of system 100 for processing business transaction entities, according to some example embodiments. The system 100 may include a task queue module 110, one or more worker instances 120-$i$ ($i=1, \ldots, N$), one or more data resources 140-1 ($l=1, \ldots, L$), and a cloud resources director 150.

According to some embodiments of the disclosure, the worker instances 120-$i$ ($i=1, \ldots, N$) and data resources 140-1 ($l=1, \ldots, L$) can be implemented as cloud-based computing resources. The cloud-based computing resources can include hardware and software available at a remote location and accessible over a data network. The cloud-based computing resource(s) can be dynamically re-allocated based on demand. The cloud-based computing resources may include one or more server farms/clusters including a collection of computer servers which can be co-located with network switches and/or routers. The data network may include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, packet switching communications network, circuit switching communications network), Bluetooth radio, Ethernet network, an IEEE 802.11-based radio frequency network, a Frame Relay network, Internet Protocol (IP) communications network, or any other data communication network utilizing physical layers, link layer capability, or network layer to carry data packets, or any combinations of the above-listed data networks.

The worker instances 120-$i$ ($i=1, \ldots, N$) may be of different computing capacities. The worker instances 120-$i$ ($i=1, \ldots, N$) may run multiple worker threads 130-$i$-$j$ ($i=1, \ldots, N; j=1, \ldots, M$) for processing submission entities 105. The worker threads 130-$i$-$j$ ($i=1, \ldots, N; j=1, \ldots, M$) can be started and shut down based on requests from the task queue module 110. The worker instances 120-$i$ ($i=1, \ldots, N$) can be started and shut down by the cloud resource director 150. Details of functions for the task queue module 110 and the cloud resource director 150 are described in FIG. 2.

The data resources 140-1 ($l=1, \ldots, L$) can be configured to store data associated with one or more organizations. The data resources 140-1 ($l=1, \ldots, L$) can obtain requests, for example search queries, from the worker instances 120-$i$ ($i=1, \ldots, N$), run the search queries over the data, and return back the results of the search request. The data resources 140-1 ($l=1, \ldots, L$) may include two or more data resources having different computational capacities and configured to process the same type of search requests.

Submission entities 105 may include messages and documents. The content of the submission entities 105 can be structured, marked, and formatted based on one or more structure schemes, such as Extensible Markup Language (XML) or JavaScript Object Notation (JSON). Some of the submission entities 105 may have dependencies on other submission entities 105. Processing a submission entity may include one or more operations. Some of the operations of processing the submission entity can be independent of processing of other submission entities. Other operations of processing the submission entity may depend on results of processing of other submission entities.

Dependencies between the submission entities 105 can be determined by various properties. For example, submission entities may have different versions v1, v2, v3, and so forth. Therefore, it is necessary to make sure that a later version, for example v3, is not processed prior to an earlier version, for example v2. Typically, the versions of a submission entity are processed in a correct order because the versions are not submitted rapidly. However, in some instances, two versions of the same submission entity can be submitted shortly after each other, if, for example, an author of the submission entity has found mistakes in the submission entity shortly after sending the previous version.

Dependencies may be based on explicit links in the submission entities. For example, a submission entity B may refer to another submission entity A. In this case it is important that the submission entity A has been processed before the submission entity B.

Figure 2:
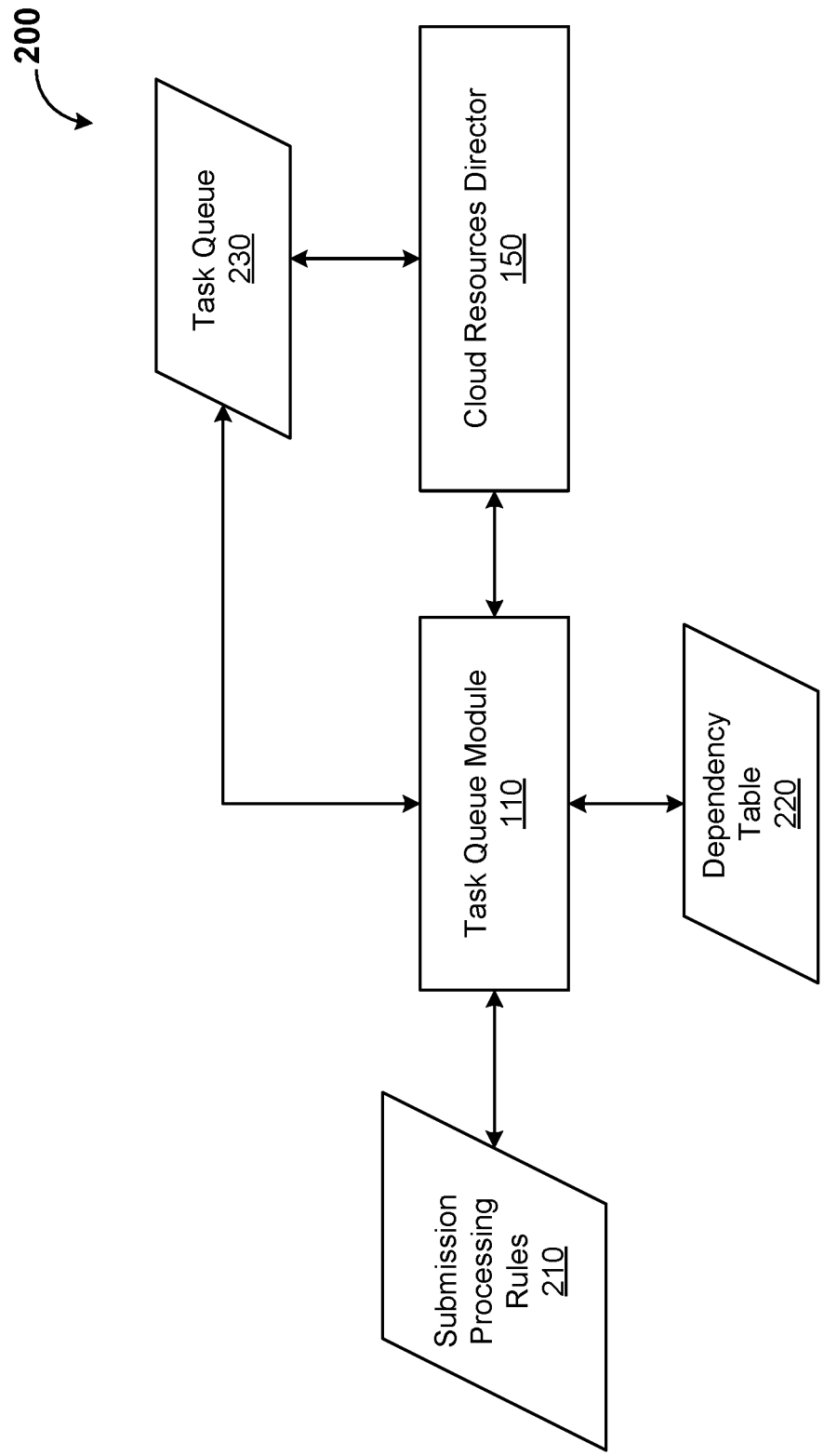
FIG. 2 is a block diagram of an example task queue module, according to an example embodiment.

FIG. 2 is a block diagram showing data 200 associated with the task queue module 110 and the cloud resource director 150. The data 200 may include submission processing rules 210, a dependency table 220, and a task queue 230. In some embodiments, the processing rules 210, dependency table 220, and task queue 230 can be implemented as text files formatted according to one or more structured text formats. In other embodiments, the processing rules 210, dependency table 220, and task queue 230 can be implemented as tables or databases.

The task module 110 can receive the submission entities 105 (shown in FIG. 1) in a queue. Upon receiving a new submission entity, the task module 110 can assign a unique sequence number to the new submission entity. The unique sequence numbers of the submission entities order the submission entities by time of receipt by the task module 110. The task queue module 110 can analyze the new submission entry to determine whether the new submission entry depends on other submission entries.

The task queue module 110 can generate, based on the submission processing rules 210, tasks for processing the submission entity. The tasks may include operations independent of processing other submission entities. For example, the independent tasks may include: (1) general syntax validation of the submission entity according to a schema, for example a W3C XML Schema; (2) conversion of the submission entity into one or more human readable formats, for example converting the submission entity from XML format to Hypertext Markup Language (HTML) format to view on a web browser and to PDF format to print; and (3) internal validation of data consistency inside the submission entity.

The tasks for processing the submission entities may include operations which are not independent of other submission entities. For example, a task dependent on other submission entities may include: (4) validation of data consistency that is in relation to previously processed submission entities, and (5) loading of content of the submission entity into relational databases. The loading may include generating links to data contributed by other submission entities. The validation of data consistency that is in relation to previously processed submission entities can commence only when the loading of the other submission entities that the submission entity depends on has been completely processed.

The submission processing rules 210 may include rules for processing different types of the submission entities. The task for processing of a submission entity may depend on a type of the submission entity. The tasks for processing the submission entity may include less or more than operations (1)-(5) described above. For example, the tasks may include translation of a submission entity from one human language to another human language, scanning the content of the submission entity for detecting keywords and codes, and so forth. An order of the tasks can be different from the order of the operations (1)-(5).

The task queue module 110 may store the tasks for the submission entities into the task queue 230. The task may have two statuses: pending and completed. Pending tasks are the tasks have been generated based on the submission processing rules 210 and require execution. Completed tasks are the tasks that have been completed. When a task for a submission entity has been completed, the task queue module 110 may search the submission processing rules 210 to determine whether follow-up tasks should be taken next on the same submission entity.

The list of all pending tasks in task queue forms a queue that is processed by the worker threads 130-$i$-$j$ ($i$=1, ..., N; $j$=1, ..., M) on the worker instances 120-$i$ ($i$=1, ..., N) shown in FIG. 1. The tasks independent of each other can be processed in parallel. The number of running worker instances and worker threads can be related to a degree of dependencies in pending tasks. The fewer dependencies between tasks and submission entities, the more worker threads that can operate in parallel, allowing for increased processing speed as compared to sequential processing. Typically, performing the tasks in a sequential order is an exception rather than a rule. For example, among 400 submission entities that may be received and processed in one hour, only 10 or less might have any dependencies. Therefore, 390 submission entities can be processed in a parallel set of worker threads and only a few tasks for processing submission entities are required to wait for previous tasks to be completed for these submission entities and other submission entities these submission entities depend on.

The task queue module 110 may determine that a task in the task queue 230 has dependencies on other tasks and set a flag to the task. The task queue module 110 may store unique sequence numbers of submission entities upon which the task depends into the dependency table 220. The dependencies can be tracked only for pending tasks. For example, if the second task depends on the first task, then as soon as the first has been completed, the dependency between the second task and the first task becomes irrelevant. Because of this, the dependency table 220 can be kept of small size at any given time and, hence, checks for dependency of a given pending task can be performed quickly.

When a worker thread requests a pending task from the task queue 230, the worker thread can determine, based on the dependency table 220, whether the pending task depends on incomplete tasks. If the pending task depends on incomplete tasks, then the worker thread skips the new task and proceeds with the next task in the task queue 230. Another worker thread may then request the pending task from the queue, determine that the pending task does not depend on any other pending tasks in the task queue 230, and process the pending task.

In some embodiments, the cloud resource director 150 may control a number and type of running worker instances 120-$i$ ($i$=1, ..., N) based on a backlog of the task queue 230. The cloud resource director 150 can start one or more of the worker instances 120-$i$ ($i$=1, ..., N) when the backlog of the queue starts to grow. The cloud resource director 150 may shut down one or more of the worker instances 120-$i$ ($i$=1, ..., N) when the backlog shrinks. The benefit of this approach is that a large number of parallel worker instances can be launched when a rate of receiving of submission entities is high, and then the worker instances can be shut down in times when the rate of receiving the submission entities is low.

In some embodiments, the cloud resource director 150 may control a number and type of running worker instances 120-$i$ ($i$=1, ..., N) based on an algorithm deciding to start one or more worker instances or shutdown one or more running worker instances. The algorithm can be based on a plurality of measurements. The measurements may include determining a backlog of the task queue 230. The backlog can be defined as a number of pending tasks in the task queue 230. The measurements may include determining task saturation of the running worker instances. In some embodiments, the measurements may also include central processing unit (CPU) and disk input/output (I/O) load of the data resources 140-1 ($l$=1, ..., L)

In some embodiments, the cloud resource director 150 can keep the task saturation of the running worker instances near full CPU capacity and above a capacity threshold (for example, 80%). If the worker instances are running significantly under the capacity threshold, this means that starting yet another worker instance will be unlikely to increase the overall task throughput. The overall task throughput may not be increased due to bottlenecks, such as common resources on which the worker threads of the worker instances depend. Such common resources may include the task queue module 110 itself. For example, the task queue module 110 cannot process the number of requests from the worker threads that is too large for new tasks, thereby causing the worker threads to wait. On the other hand, the worker threads can be waiting for a common data resource 140-1, for example, for the tasks of storing structured data of the submission entity into one or more databases. If the common data resource 140-1 is running at full capacity, then starting additional worker instances 120-$i$ ($i$=1, ..., N) and worker threads 130-$i$-$j$ ($i$=1, ..., N; $j$=1, ..., M) will not increase task throughput or reduce the task throughput due to thrashing in the data resource 140-1.

In some embodiments, the cloud resource director 150 may monitor the backlog and task saturation of the worker instances. The cloud resource director 150 may analyze the backlog and task saturation to determine that the task backlog is growing for a predetermined time and adding a new worker instance reduces the saturation of the worker instances but fails to increase the task throughput. At the same time, the cloud resource director 150 may measure CPU capacities of the data resources 140-1 ($l$=1, ..., L). If some of the data resources 140-1 (l1=1, . . . , L) are running at CPU capacity larger than a CPU capacity threshold, for example 90%, and/or with I/O operations per second (IOPS) near 100%, then the cloud resource director 150 may replace these data resources with data resources having a larger database throughput capacity.

The data resources 140-1 (l=1, . . . , L) may include a plurality of databases. One of the databases may run as a master database and the other databases can run as "active" or "hot" standby databases. A database of the plurality of databases may comprise a database server and a database storage including disks and virtual disks. The "hot" standby databases may constantly receive, from the master database, transaction logs to be applied to their own database storage. At the same time, the standby databases can be configured to respond to search queries and not to insert or update the transaction logs. This means that new submission entities can be stored only via the master database. However, the data for the new submission entities can be searched using the "hot" standby database. There can be a million search queries per day sent to the database, but only a few thousand requests to change the database. Therefore, the plurality of databases may include many "hot" standby databases serving the search queries but only one master database to handle transactions requiring data update. A database load balancer can be used to determine which databases should be used to respond to query requests and which database should be used for data update.

When the backlog of the task queue 230 is growing, the cloud resource director 150 can upgrade the master database by briefly shutting down a first "hot" standby database and changing the first standby database to a second standby database. The second standby database may have larger CPU capacity and larger memory than the first standby database. The cloud resource director 150 may restart the second standby database. After the second standby database is brought up to date as a hot standby, the database load balancer may switch the master database over to the second database. The first database, which was the master database before, becomes a hot standby.

When the backlog of the task queue decreases and goes below a certain threshold, the cloud resource director 150 may shut down one or more worker instances and scale down one or more of the running databases by shutting the databases down and replacing them with databases having less CPU and memory capacities.

In some embodiments, the cloud resource director 150 can keep all cloud resources (the worker instances and data sources) maximally loaded, for example at CPU capacity over 70% or I/O throughput of database server capacity over 70%. When the load of the cloud resources falls below these thresholds for a sufficient amount of time (predictable by the queue backlog length), the cloud resource director 150 can shut down worker instances or hot standby databases, and scale down the master database server back to a lower capacity (and, hence, lower cost) database server.

Figure 3:
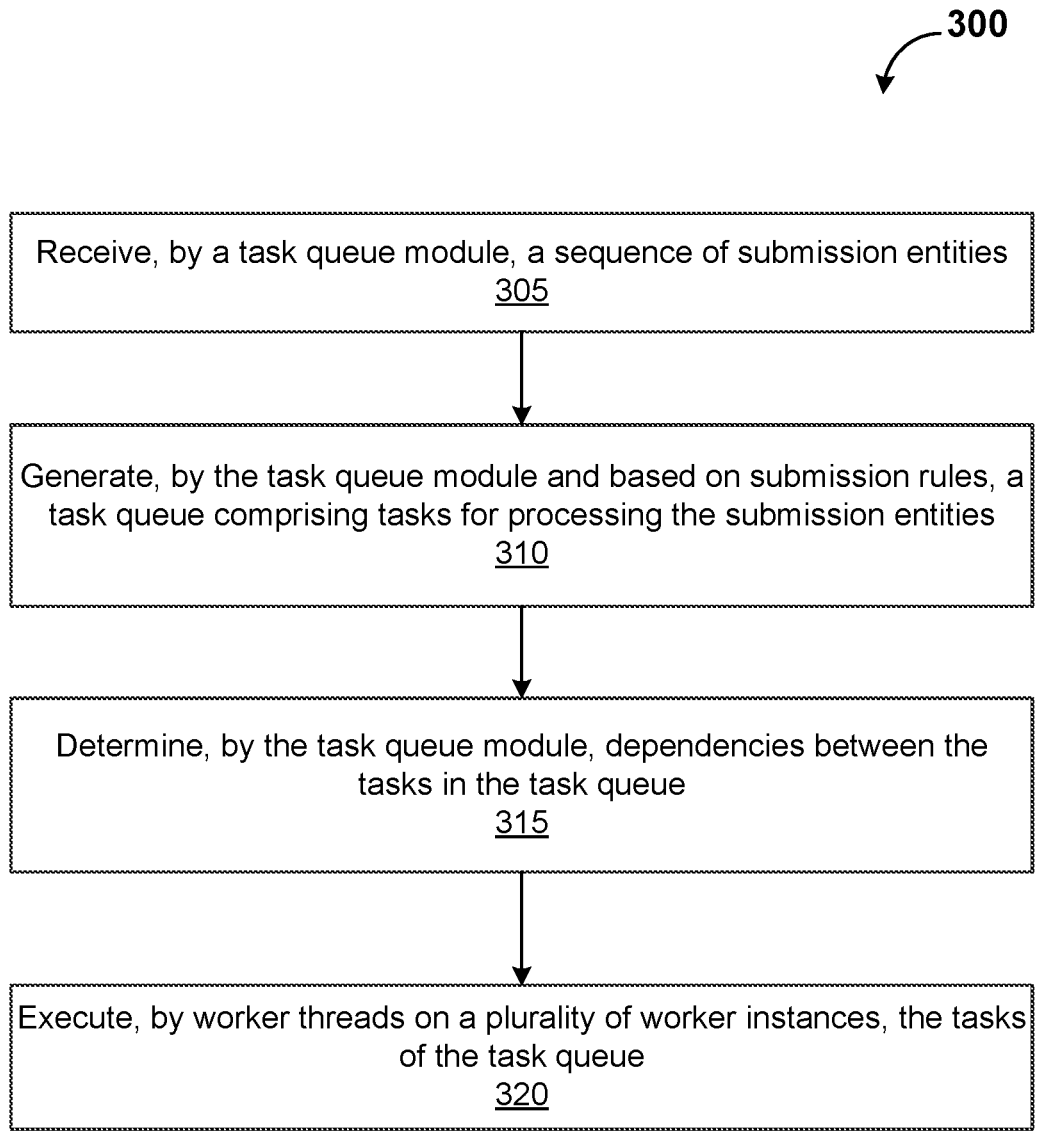
FIGS. 3-8 are flow charts showing operations of a method for processing business transaction entities, according to some example embodiments.

FIG. 3 is a flow chart of an example method 300 for processing business transaction entities, according to some example embodiments. The method 300 may be performed by the system 100 described above with references to FIG. 1 and FIG. 2. Method 300 may have additional operations not shown herein, but which can be evident to those skilled in the art from the present disclosure. Method 300 may also have fewer operations than outlined below and shown in FIG. 3.

The method 300 can commence, in block 305, with receiving, by a task queue module, a sequence of submission entities.

In block 310, the method 300 may include generating, by the task queue module and based on submission processing rules, at least one task for processing the submission entities. The submission entity includes a document or a message carrying business transaction.

In block 315, the method 300 may include adding, by the task module, at least one task to a task queue. The task may include one of the following: validating a submission entity of the sequence of the submission entities against a schema, validating a content of the submission entity against business rules, transforming the submission entity into one or more renderings, performing natural language processing of the submission entity, translating the submission entity from a first human language into a second human language, indexing the submission entity with at least one index for a free text search, and storing structured data of the submission entity to one or more databases. The natural language processing may include one of the following: phrase detection, concept detection, and natural language parsing.

In block 315, the method 300 may include determining, by the task queue module, dependencies between tasks in the task queue. The determining dependencies between the tasks may include determining that a first submission entity of the sequence of submission entities is a later version of a second submission entity of the sequence of submission entities. The determining dependencies between the tasks may include determining that the first submission entity of the sequence of submission entities explicitly refers to the second submission entity of the sequence of submission entities. The determining dependencies between the tasks may include determining that the first submission entity of the sequence of submission entities explicitly refers to a subject matter determined based on one of identifiers, keywords, and codes included in the second submission entity of the sequence of submission entities.

Prior to determining the dependencies between the tasks in the task queue, the method 300 may include assigning, by the task queue module, submission sequence numbers to the submission entities. The submission sequence numbers may indicate an order of receiving the submission entities. The method 300 may include keeping the submission sequence numbers of the submission entities in a dependency table until all tasks associated with the submission entities are completed.

In block 320, the method 300 may include executing, by worker threads on a plurality of worker instances, the tasks of the task queue. The worker instances may include physical computer machine instances and virtual computer instances. The virtual computer instance may include a cloud-based computing resource. Hardware of the worker instances can be optimized for processing one of the following: memory intensive tasks, processor intensive tasks, tasks requiring reading or writing access to the same resources, and tasks requiring support of an acceleration hardware. The worker threads can be executed on the same worker instance. The details of the block 320 are described below with references to FIG. 4.

Figure 4:
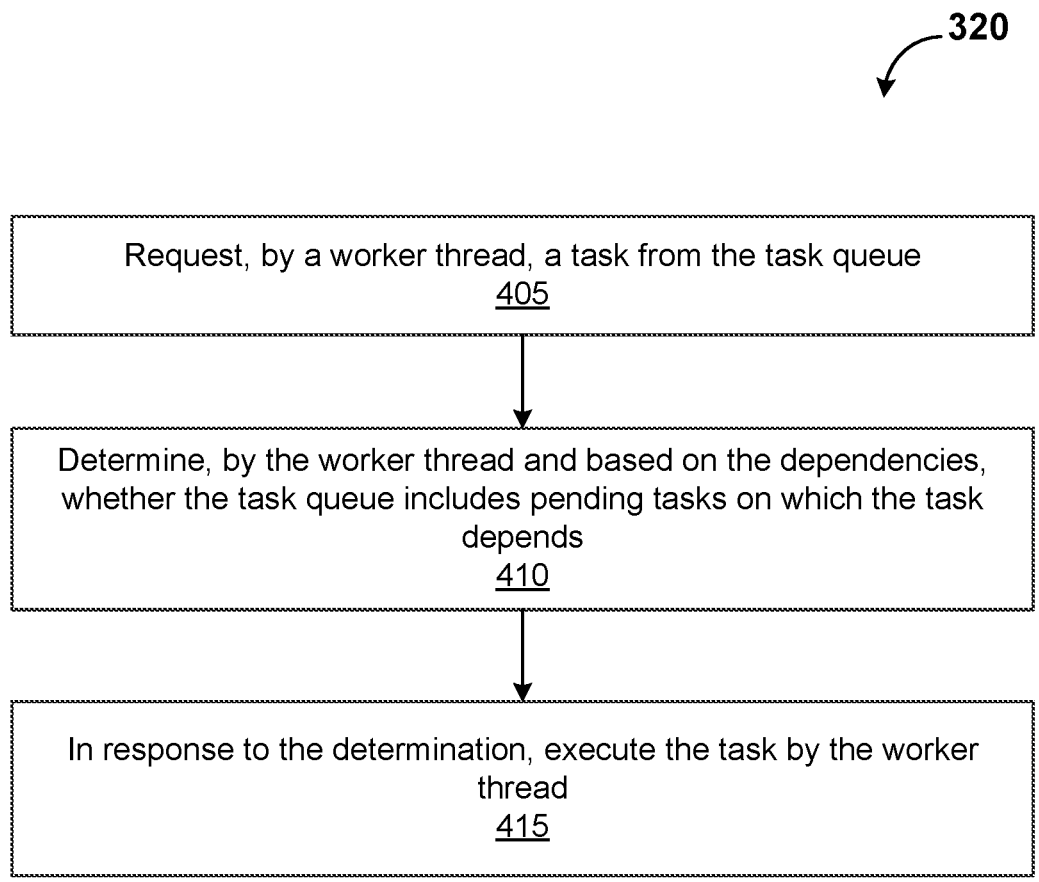

FIG. 4 is a flow chart showing operations of the block 320 of the method 300 of FIG. 3, according to some example embodiments. In block 405, the method 300 may include requesting, by a worker thread of the worker threads, a task from the task queue. In block 410, the method 300 may include determining, by the worker thread and based on the dependencies, that the task queue does not include pending tasks on which the task depends. In block 415, the method 300 may include, in response to the determination, executing, by the worker thread, the task. Upon receiving, by the task queue module, an indication that the worker thread has finished the task, the method may include generating, by the task queue module and based on the submission processing rules, one or more follow up tasks. The method may include adding, by the task queue module, the follow up tasks to the task queue. The method may include updating, by the task queue module, the dependencies between tasks in the task queue.

Figure 5:
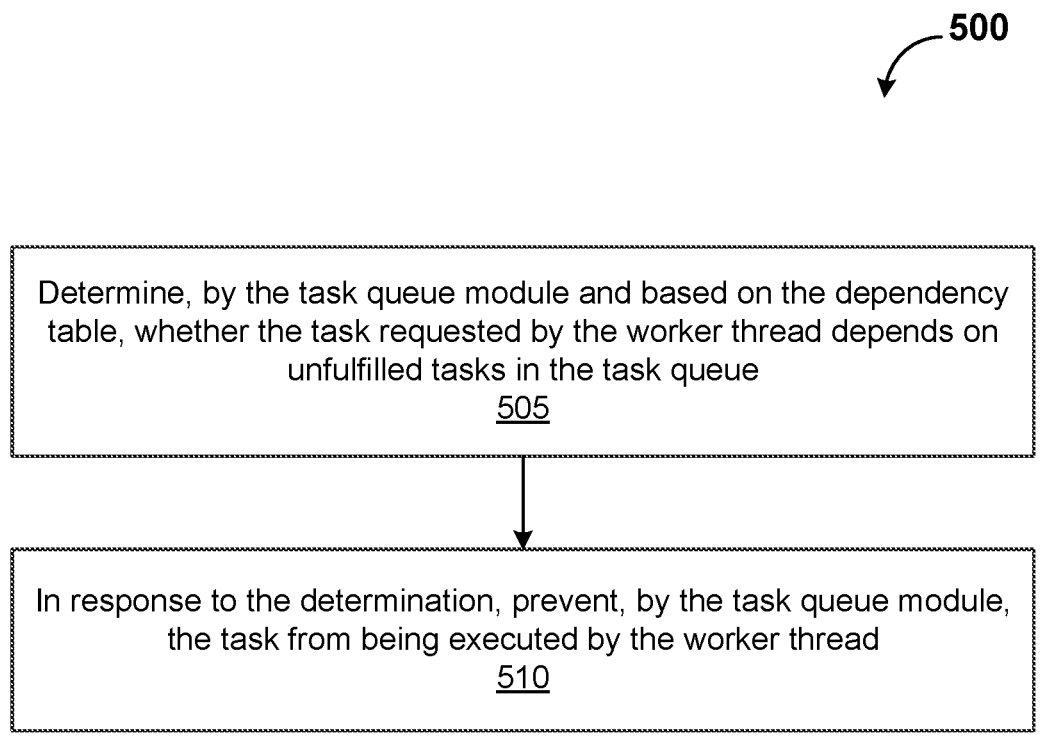

FIG. 5 is a flow chart of additional operations of the method 500 for processing business transaction entities, according to some example embodiments.

In block 505, the method 300 may include determining, by the task queue module and based on the dependency table, that the task requested by the worker thread depends on unfulfilled tasks in the task queue. In block 510, the method 300 may include, in response to the determination, preventing, by the task queue module, the task from being executed by the worker thread.

Figure 6:
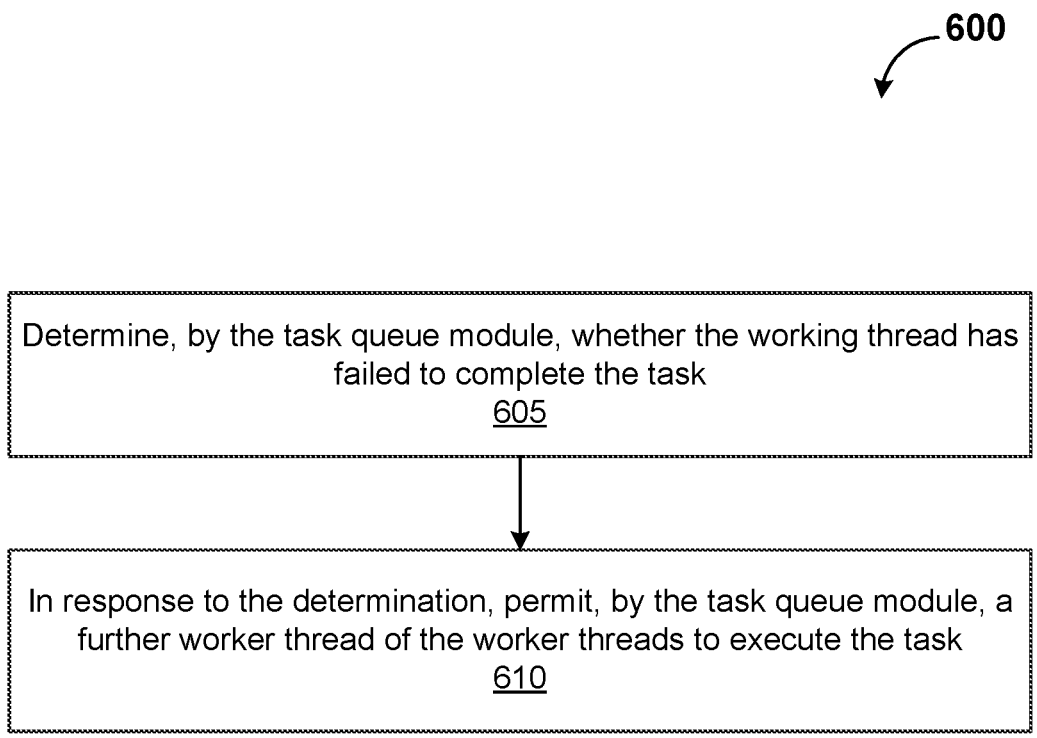

FIG. 6 is a flow chart of additional operations of the method 600 for processing business transaction entities, according to some example embodiments. In block 605, the method 300 may include determining, by the task queue module, that the worker thread has failed to complete the task. In block 605, the method 600 may include, in response to the determination, permitting, by the task queue module, a further worker thread of the worker threads to execute the task.

Figure 7:
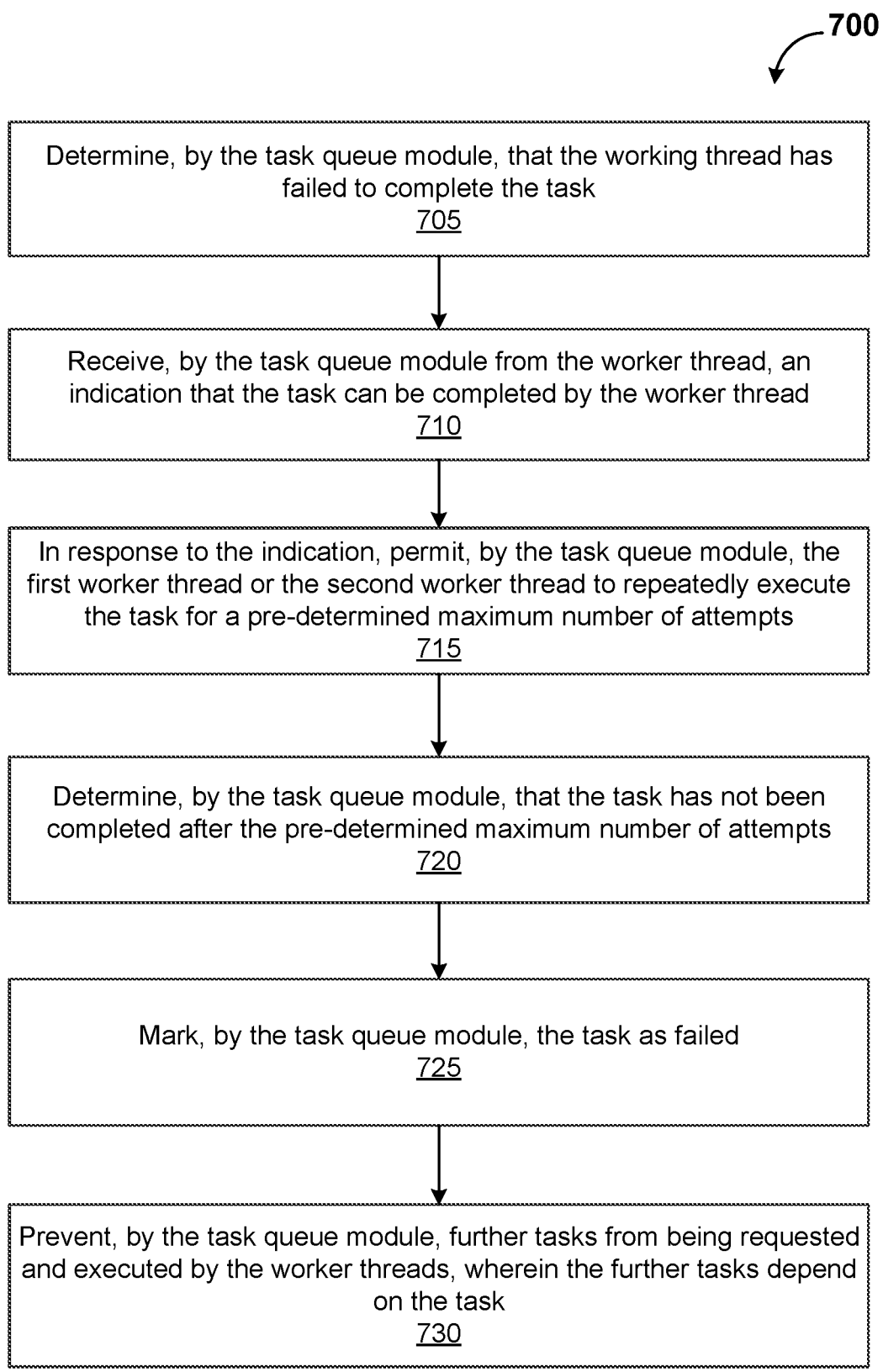

FIG. 7 is a flow chart of additional operations of the method 700 for processing business transaction entities, according to some example embodiments. In block 705, the method 300 may include determining, by the task queue module, that the worker thread has failed to complete the task.

In block 710, the method 300 may include receiving, by the task queue module from the worker thread, an indication that the task can be completed by the worker thread or by a further worker thread.

In block 715, the method 300 may include, in response to the indication, permitting, by the task queue module, the first worker thread or the second worker thread to repeatedly execute the task with a pre-determined maximum number of attempts.

In block 720, the method 300 may include determining, by the task queue module, that the task has not been completed after the pre-determined maximum number of attempts.

In block 725, the method 300 may include, in response to the determination, marking, by the task queue module, the task as failed.

Figure 8:
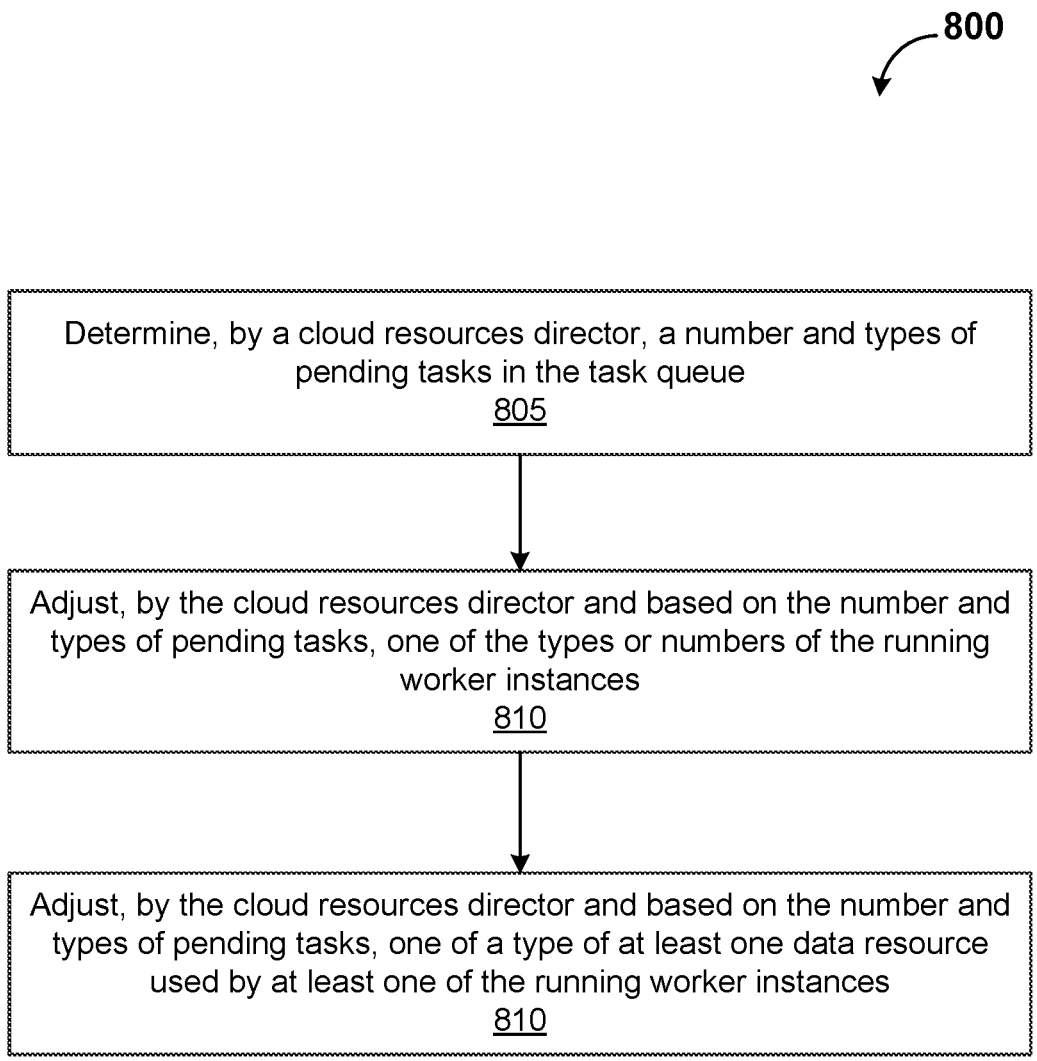

In block 730, the method 300 may include preventing, by the task queue module, further tasks from being requested and executed by the worker threads, wherein the further tasks depend on the task FIG. 8 is a flow chart of additional operations of the method 800 for processing business transaction entities, according to some example embodiments.

In block 805, the method 300 may include determining, by a cloud resources director, a number and types of pending tasks in the task queue.

In block 810, the method 300 may include adjusting, by the cloud resources director and based on the number and types of pending tasks, one of the types or numbers of the running worker instances.

In some embodiments, adjusting the types and numbers of the running worker instances may include determining that a number of tasks of a specific task type in the backlog exceeds a threshold. In response to the determination, the method 300 may include stopping a first worker instance of the plurality of the worker instances, the first worker instance being designated for the specific task type. The method 300 may start a second worker instance of the plurality of worker instances. The second worker instance can be designated for the specific task type and a capacity of the second worker instance is larger than a capacity of the first worker instance.

In certain embodiments, adjusting the types and numbers of the running worker instances may include determining that a number of tasks of a specific task type in the backlog is less than a threshold. In response to the determination, the method 300 may include stopping at least one running worker instance of the plurality the worker instances.

In some other embodiments, adjusting the types and numbers of the running worker instances may include determining that a number of tasks of a specific task type in the backlog is less than a threshold. In response to the determination, the method 300 may include stopping a first worker instance of the plurality of the worker instances, the first worker instance being designated for the specific task type. The method 300 may include starting a second worker instance of the plurality of worker instances. The second worker instance can be designated for the specific task type and a capacity of the second worker instance is less than a capacity of the first worker instance.

In yet some other embodiments, adjusting the types and numbers of the running worker instances may include determining that a capacity utilization level of a first worker instance of the plurality of worker instance tasks is less than a threshold. The first worker instance is designated to a specific task type. The capacity utilization level may include one of the following: a CPU utilization level, a memory usage percentage, and disk reading and writing utilization level.

In response to the determination, the method 300 may include stopping the first worker instance. The method 300 may include starting a second worker instance of the plurality of worker instances. The second worker instance can be designated for the specific task type and a capacity of the second worker instance is less than a capacity of the first worker instance.

In block 815, the method 300 may include adjusting, by the cloud resources director and based on the number and types of pending tasks, a type of at least one data resource used by at least one of the running worker instances. The adjusting the type of the data resource may include starting a lesser capacity data resource and stopping a higher capacity data resource. The adjusting the type of the data resource may include starting the higher capacity data resource and stopping the lesser capacity data resource.

Figure 9:
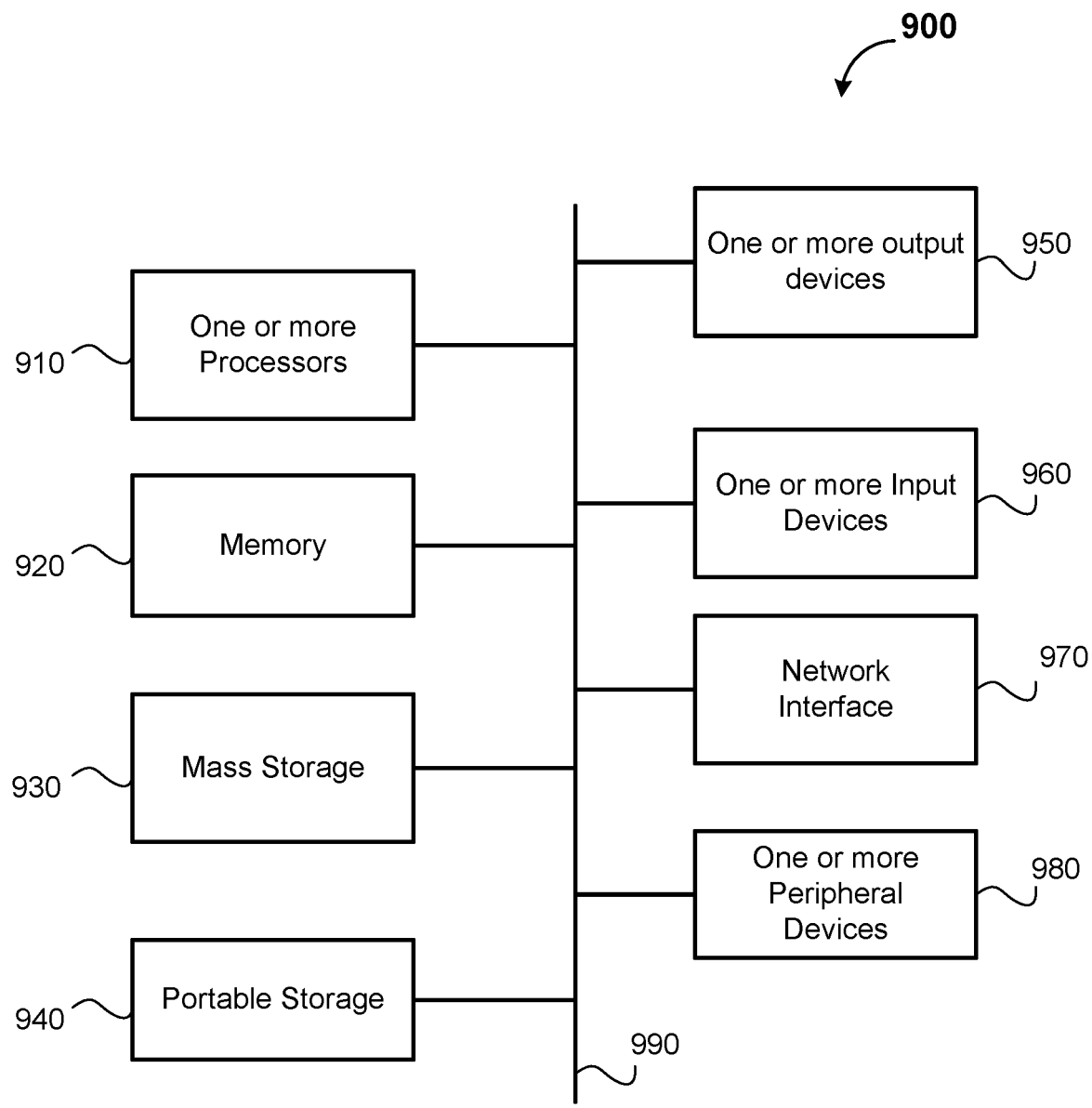
FIG. 9 shows a computing system that can be used to implement a method for processing business transaction entities, according to an example embodiment.

FIG. 9 illustrates an exemplary computing system 900 that may be used to implement embodiments described herein. The computing system 900 can be implemented in context of the task queue module 110, the cloud resource director 150, the worker instances 120-$i$ ($i$=1, . . . , N), and data resources 140-1 ($l$=1, . . . , L). The exemplary computing system 900 of FIG. 9 may include one or more processors 910 and memory 920. Memory 920 may store, in part, instructions and data for execution by the one or more processors 910. Memory 920 can store the executable code when the exemplary computing system 900 is in operation. The exemplary computing system 900 of FIG. 9 may further include a mass storage 930, portable storage 940, one or more output devices 950, one or more input devices 960, a network interface 970, and one or more peripheral devices 980.

The components shown in FIG. 9 are depicted as being connected via a single bus 990. The components may be connected through one or more data transport means. The one or more processors 910 and memory 920 may be connected via a local microprocessor bus, and the mass storage 930, one or more peripheral devices 980, portable storage 940, and network interface 970 may be connected via one or more I/O buses.

Mass storage 930 may be implemented as a non-volatile storage device or other storage device for storing data and instructions, which may be used by one or more processors 910. Mass storage 930 can store the system software for implementing embodiments described herein for purposes of loading that software into memory 920.

Portable storage 940 may operate in conjunction with a portable non-volatile storage medium to input and output data and code to and from the computing system 900 of FIG. 9. The system software for implementing embodiments described herein may be stored on such a portable medium and input to the computing system 900 via the portable storage 940.

One or more input devices 960 provide a portion of a user interface. The one or more input devices 960 may include an alphanumeric keypad, such as a keyboard, for inputting alphanumeric and other information, or a pointing device, such as a mouse, a trackball, a stylus, or cursor direction keys. Additionally, the computing system 900 as shown in FIG. 9 includes one or more output devices 950. Suitable one or more output devices 950 include speakers, printers, network interfaces, and monitors.

Network interface 970 can be utilized to communicate with external devices, external computing devices, servers, and networked systems via one or more communications networks such as one or more wired, wireless, or optical networks including, for example, the Internet, intranet, LAN, WAN, cellular phone networks (e.g., GSM communications network, packet switching communications network, circuit switching communications network), Bluetooth radio, and an IEEE 802.11-based radio frequency network, among others. Network interface 970 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 980 may include any type of computer support device to add additional functionality to the computing system. The one or more peripheral devices 980 may include a modem or a router.

The components contained in the exemplary computing system 900 of FIG. 9 are those typically found in computing systems that may be suitable for use with embodiments described herein and are intended to represent a broad category of such computer components that are well known in the art. Thus, the exemplary computing system 900 of FIG. 9 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as Random-Access-Memory (RAM). Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a compact disk read-only memory (CD-ROM), a digital versatile disk (DVD), any other optical medium, a RAM, a programmable read-only memory (PROM), an erasable programmable read-only memory (EPROM), an electrically erasable programmable read-only memory (EEPROM), a flash memory storage, any other memory chip, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The processing for various embodiments of the present disclosure may be implemented by cloud-based software. In some embodiments, the computing system 900 is implemented as a cloud-based computing environment, such as a virtual machine operating within a computing cloud. The computing cloud can be formed, for example, by a network of web servers that comprise a plurality of computing devices, such as the computing system 900, with each web server or a plurality of the web servers providing processor and storage resources. These web servers may manage workloads provided by multiple users, for example, cloud resource customers.

Thus, systems and methods for processing business transaction entities have been described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A computer-implemented method for processing business transaction entities, the method comprising:
    receiving, by a task queue module, a sequence of submission entities;
    generating, by the task queue module and based on submission processing rules, at least one task for processing the submission entities;
    adding at least one task to a task queue;
    determining, by the task queue module, dependencies between tasks in the task queue;
    executing, by worker threads on a plurality of worker instances, the tasks of the task queue, wherein the executing includes:
        requesting, by a worker thread of the worker threads, a task from the task queue;
        determining, by the worker thread and based on the dependencies, that the task queue does not include pending tasks on which the task depends; and
        in response to the determination, executing, by the worker thread, the task;
    determining, by a cloud resources director, a number and types of pending tasks in the task queue; and
    adjusting, by the cloud resources director and based on the number and types of pending tasks, one of types or numbers of running worker instances of the plurality of worker instances, wherein the adjusting includes:
        determining that a number of tasks of a specific task type in the backlog exceeds a threshold; and
        in response to the determination:
            stopping a first worker instance of the plurality of worker instances, the first worker instance being designated for the specific task type; and
            starting a second worker instance of the plurality of worker instances, wherein the second worker instance is designated for the specific task type, wherein a capacity of the second worker instance is larger than a capacity of the first worker instance.

2. The method of claim 1, further comprising:
    receiving, by the task queue module, an indication that the worker thread has finished the task;
    generating, by the task queue module and based on the submission processing rules, one or more follow up tasks;
    adding, by the task queue module, the follow up tasks to the task queue; and
    updating, by the task queue module, the dependencies between tasks in the task queue.

3. The method of claim 1, wherein the submission entities include a document or a message carrying business transaction.

4. The method of claim 1, wherein the tasks include at least one of the following:
    validating a submission entity of the sequence of the submission entities against a schema;
    validating a content of the submission entity against business rules;
    transforming the submission entity into one or more renderings;
    translating the submission entity from a first human language into a second human language;
    performing natural language processing of the submission entity, wherein the natural language processing includes at least one of the following: phrase detection, concept detection, and natural language parsing;
    indexing the submission entity with at least one index for a free text search; and
    storing structured data of the submission entity to one or more databases.

5. The method of claim 1, wherein a hardware of at least one of the worker instances is optimized for processing at least one of the following:
    memory intensive tasks;
    processor intensive tasks;
    tasks requiring reading or writing access to same resources; and
    tasks requiring support of an acceleration hardware.

6. The method of claim 1, wherein the worker instances include physical computer machine instances.

7. The method of claim 1, wherein the worker instances include virtual computer instances, the virtual computer instances including at least one cloud-based computing resource.

8. The method of claim 1, wherein at least two of the worker threads are executed on a same worker instance of the worker instances.

9. The method of claim 1, wherein determining the dependencies between the tasks in the task queue includes determining whether one of the following conditions is satisfied:
    a first submission entity of the sequence of submission entities is a later version of a second submission entity of the sequence of submission entities;
    the first submission entity of the sequence of submission entities explicitly refers to the second submission entity of the sequence of submission entities; and
    the first submission entity of the sequence of submission entities explicitly refers to a subject matter determined based one of identifiers, keywords, and codes included in the second submission entity of the sequence of submission entities.

10. The method of claim 9, further comprising, prior to determining the dependencies between the tasks in the task queue, assigning, by the task queue module, submission sequence numbers to the submission entities, wherein the submission sequence numbers indicate an order of receiving the submission entities.

11. The method of claim 10, further comprising keeping the submission sequence numbers of the submission entities in a dependency table until all tasks associated with the submission entities are completed.

12. The method of claim 11, further comprising:
    determining, by the task queue module and based on the dependency table, that the task requested by the worker thread depends on unfulfilled tasks in the task queue; and
    in response to the determination, preventing, by the task queue module, the task from being executed by the worker thread.

13. The method of claim 1, further comprising:
    determining, by the task queue module, that the worker thread has failed to complete the task; and
    in response to the determination, permitting, by the task queue module, a further worker thread of the worker threads to execute the task.

14. The method of claim 1, further comprising:
    determining, by the task queue module, that the worker thread has failed to complete the task;
    receiving, by the task queue module from the worker thread, an indication that the task can be completed by the worker thread or by a further worker thread;
    in response to the indication, permitting, by the task queue module, the first worker thread or the second worker thread to repeatedly execute the task with a pre-determined maximum number of attempts;
determining, by the task queue module, that the task has not been completed after the pre-determined maximum number of attempts; and
in response to the determination:
marking, by the task queue module, the task as failed; and
preventing, by the task queue module, further tasks from being requested and executed by the worker threads, wherein the further tasks depend on the task.

15. The method of claim 1 wherein the adjusting further includes:
determining that a further number of tasks of a further specific task type in the backlog is less than a further threshold; and
in response to the determination, stopping at least one running worker instance of the plurality the worker instances.

16. The method of claim 1 wherein the adjusting further includes:
determining that a further number of tasks of a further specific task type in the backlog is less than a further threshold; and
in response to the determination:
stopping a third worker instance of the plurality of worker instances, the third worker instance being designated for the further specific task type; and
starting a fourth worker instance of the plurality of worker instances, wherein the fourth worker instance is designated for the further specific task type; and
wherein a capacity of the fourth worker instance is less than a capacity of the third worker instance.

17. The method of claim 1 wherein the adjusting further includes:
determining that a capacity utilization level of a third worker instance of the plurality of worker instances is less than a further threshold, wherein the third worker instance is designated to a further specific task type;
in response to the determination:
stopping the third worker instance; and
starting a fourth worker instance of the plurality of worker instances, wherein the fourth worker instance is designated for the further specific task type and a capacity of the fourth worker instance is less than a capacity of the third worker instance.

18. The method of claim 17, wherein the capacity utilization level is one of: a central processing unit utilization level, a memory usage percentage, and disk reading and writing utilization level.

19. The method of claim 1, further comprising:
adjusting, by the cloud resources director and based on the number and types of pending tasks, one of a type of at least one data resource used by at least one of the running worker instances.

20. The method of claim 19, wherein the adjusting includes one of the following:
starting a lesser capacity data resource and stopping a higher capacity data resource; and
starting the higher capacity data resource and stopping the lesser capacity data resource.

21. A system for processing business transaction entities, the system comprising:
a task queue module;
worker threads being executed on a plurality of worker instances; and
a cloud resources director, wherein:
the task queue module is configured to:
receive a sequence of submission entities;
generate, based on submission processing rules, at least one task for processing the submission entities;
add at least one task to a task queue; and
determine dependencies between tasks in the task queue; and
the worker threads are configured to process the tasks of the task queue, wherein the processing includes:
requesting, by a worker thread of the worker threads, a task from the task queue;
determining, by the worker thread and based on the dependencies, that the task queue does not include pending tasks on which the task depends; and
in response to the determination, executing, by the worker thread, the task;
wherein the cloud resources director is configured to:
determine a number and types of pending tasks in the task queue; and
adjust, based on the number and types of pending tasks, one of types or numbers of running worker instances of the plurality of worker instances, wherein the adjusting includes:
determining that a number of tasks of a specific task type in the backlog exceeds a threshold; and
in response to the determination:
stopping a first worker instance of the plurality of worker instances, the first worker instance being designated for the specific task type; and
starting a second worker instance of the plurality of worker instances, wherein the second worker instance is designated for the specific task type, wherein a capacity of the second worker instance is larger than a capacity of the first worker instance.

22. The system of claim 21, wherein the task queue module is configured to:
receive an indication that the worker thread has finished the task;
generate, based on the submission processing rules, at least one follow up task;
add one or more follow up tasks to the task queue; and
update the dependencies between tasks in the task queue.

23. The system of claim 21, wherein the submission entities include a document or a message carrying business transaction.

24. The system of claim 21, wherein the tasks include at least one of the following:
validating a submission entity of the sequence of the submission entities against a schema;
validating a content of the submission entity against business rules;
transforming the submission entity into one or more renderings;
translating the submission entity from a first human language into a second human language;
performing natural language processing of the submission entity, wherein the natural language processing includes one of phrase detection, concept detection, and natural language parsing;
indexing the submission entity with at least one index for a free text search keyword; and
storing structured data of the submission entity to one or more databases.

25. The system of claim 21, wherein a hardware of at least one of the worker instances is optimized for processing at least of one of:
  memory intensive tasks;
  processor intensive tasks;
  tasks requiring reading or writing access to same resources; and
  tasks requiring support of an acceleration hardware.

26. A non-transitory processor-readable medium having instructions stored thereon, which when executed by one or more processors, cause the one or more processors to implement a method for processing business transaction entities, the method comprising:
  receiving, by a task queue module, a sequence of submission entities;
  generating, by the task queue module and based on submission processing rules, at least one task for processing the submission entities;
  adding, by the task queue module, the task queue comprising tasks for processing the submission entities;
  determining, by the task queue module, dependencies between the tasks in the task queue;
  processing, by worker threads being executed on a plurality of worker instances, the tasks of the task queue, wherein the processing includes:
    requesting, by a worker thread of the worker threads, a task from the task queue;
    determining, by the worker thread and based on the dependencies, that the task queue does not include pending tasks on which the task depends;
    in response to the determination, executing, by the worker thread, the task;
  receiving, by the task queue module, an indication that the worker thread has finished the task;
  generating, by the task queue module and based on the submission processing rules, one or more follow up tasks;
  adding, by the task queue module, the follow up tasks to the task queue;
  updating, by the task queue module, the dependencies between tasks in the task queue;
  determining, by a cloud resources director, a number and types of pending tasks in the task queue; and
  adjusting, by the cloud resources director and based on the number and types of pending tasks, one of types or numbers of running worker instances of the plurality of worker instances, wherein the adjusting includes:
    determining that a number of tasks of a specific task type in the backlog exceeds a threshold; and
    in response to the determination:
    stopping a first worker instance of the plurality of worker instances, the first worker instance being designated for the specific task type; and
    starting a second worker instance of the plurality of worker instances, wherein the second worker instance is designated for the specific task type, wherein a capacity of the second worker instance is larger than a capacity of the first worker instance.

* * * * *